June 28, 1938.  W. H. BASELT  2,122,081

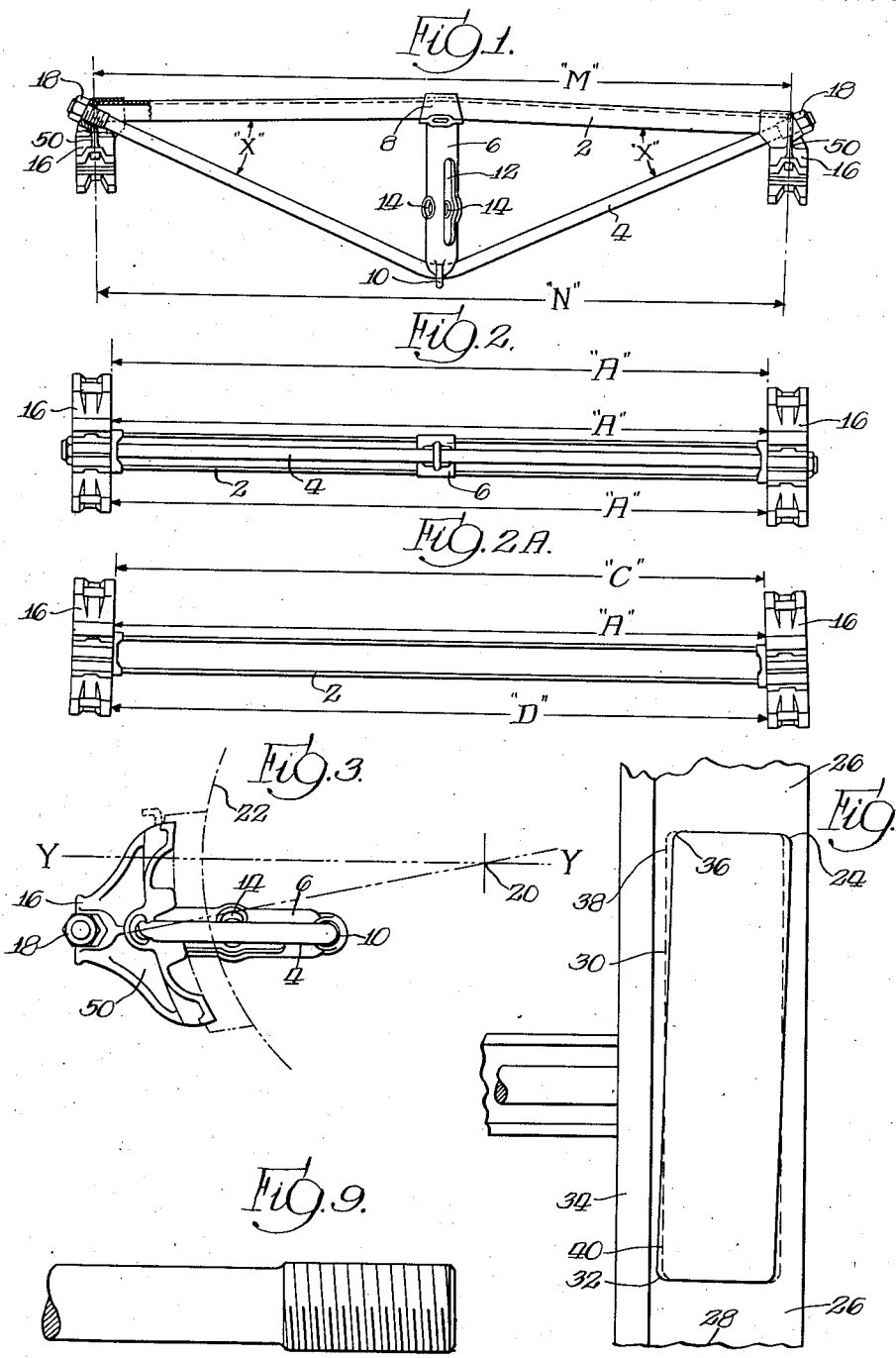

LIGHT WEIGHT BRAKE BEAM

Filed July 31, 1935  2 Sheets-Sheet 2

INVENTOR.
Walter H. Baselt.
BY Orrin O. B. Garner
ATTORNEYS.

Patented June 28, 1938

2,122,081

UNITED STATES PATENT OFFICE 2,122,081

LIGHT WEIGHT BRAKE BEAM

Walter H. Baselt, Chicago, Ill., assignor to American Steel Foundries, Chicago, Ill., a corporation of New Jersey Application July 31, 1935, Serial No. 34,038

26 Claims. (Cl. 188—222)

My invention relates to brake beams and more particularly to a special type of light weight brake beam.

A great deal of development work is being done at the present time to reduce the weight of railway equipment. In order to accomplish maximum results in this direction it is necessary to redesign a great many of the structural parts used in railway rolling stock. Brake equipment offers some opportunity for reduction of weight by redesign and one of the structural parts of brake equipment which lends itself to an improved design and reduction of weight is the brake beam. This invention is concerned with such an improved design of the truss type brake beam in which a structural shape is used for the compression member and a rolled rod for the tension member.

A primary object of this invention is to provide a brake beam having a capacity to meet the standard requirements of the A. A. R. No. 15 brake beam while, at the same time, embodying novel structural features which makes it possible to reduce considerably the weight of a beam meeting such standards.

Another object of this invention is to provide a truss type brake beam in which the axes of the tension and compression members intersect at or near the center of pressure exerted on the brake head.

Another object of the invention is the provision of a novel form of tension rod which combines light weight with a special end structure designed to prevent breakage of the rod at the threaded end. When a truss type beam is overstressed, breakdown most frequently occurs at the threaded end of the tension rod. This invention contemplates the correction of this condition.

A yet further object of this invention is to provide a truss type brake beam in which the connection between the tension member and the compression member and the brake head shall be very compact and space conserving.

The invention also contemplates such a brake beam in which the compression member and the tension member shall be connected to the head at a point which will afford maximum support to the head when subjected to the maximum stresses of service.

My invention further contemplates the provision of a novel form of brake head structure which permits a very compact connection between the head and the associated tension and compression members of the beam.

Another object of the invention is to provide such a form of connection between the compression member and the brake head as will compensate for and correct misalignment between the brake head and the wheel to which it is applied which has existed in structures heretofore used.

Still another object of my invention is to provide a beam having the before mentioned characteristics in which the compression member seat will be located approximately in the vertical center plane of the brake head thereby affording maximum support where the greatest strains occur in actual service.

A yet further object contemplated by the invention is the provision of a truss type brake beam which maintains the present standard distance between brake heads and at the same time shortens the tension member and the compression member of the beam. Shortening these members increases the angle at which they meet and so increases, relatively, the depth of the truss. Increasing the depth of the truss reduces the deflection of the beam under a given load. The chief difficulty encountered in designing a light weight brake beam is to meet the standard A. A. R. deflection requirements.

With these and various other objects in view the invention may consist of certain features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a brake beam embodying the invention;

Figure 2 is a view in elevation of the beam shown in Figure 1, looking at the brake shoe carrying surfaces of the brake heads;

Figure 2A is a view corresponding to that shown in Figure 2 with the tension member and fulcrum omitted;

Figure 3 is an end elevation of the beam shown in Figures 1 and 2;

Figure 8 is a fragmentary elevational view partly diagrammatical, showing the application of this brake beam to the tread surface of a car wheel; and Figure 9 is an enlarged view of the specially designed end portion of the tension member.

Figure 5:
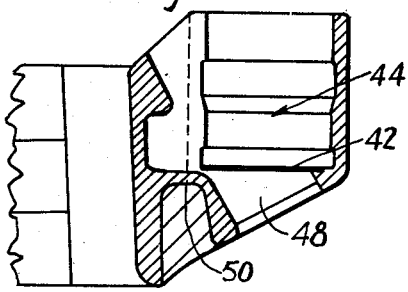
Figure 5 is a horizontal section through the brake head shown in Figure 4 on the plane indicated by the line 5—5 of Figure 4.

Describing in more detail the structure embodying the invention, the brake beam may consist of a truss structure in which the compression member 2 may be of the usual rolled channel of U-section and the tension member 4 a rolled bar having specially formed ends as hereinafter more fully described; the fulcrum 6 of a well known form having the integral collar 8 at one end embracing the compression member 2 and an eye portion 10 at its opposite end embracing the tension member 4 and having intermediate its ends the slot 12 and the eyes 14 for connection to the usual diagonally arranged brake lever; and brake heads 16 secured in position at the ends of the tension and compression members by the nuts 18 having threaded connection to the ends of the tension rod 4.

My invention contemplates a novel form of connection between the tension member 4, the compression member 2 and the brake head 16. I have devised a structure which is much more compact than that which has heretofore been used, making it possible to produce a beam of lighter weight while at the same time meeting the standard deflection test required of the present beam. I have accomplished this by shortening the compression member as well as the tension member and connecting them to the head as nearly as possible at the pressure center of the head. In other words, the head structure itself is reinforced by having a seat for the end of the compression member immediately back of the pressure center of the head; and closely adjacent the compression member seat I have located the seat for the nut which secures the tension member and at the same time holds the head firmly against the end of the compression member in the seat provided for the latter. The detail of these features will become more apparent as the description proceeds.

By shortening the tension member 4 and the compression member 2 while at the same time maintaining the standard length of the fulcrum 6, I have increased the angle "X" at which the compression member and the tension member meet and thus in effect I have increased the relative depth of this truss structure.

In shortening the compression member and the tension member I have not lessened the distance from the shoe-carrying surface of the head on one end of the beam to the shoe-carrying surface of the head at the opposite end of the beam. This dimension "A" between the shoe-carrying surfaces of the brake heads is standard, due of course to the standard gauge of railroad trackage in the United States. The length of the fulcrum 6 is also standard. In designing a lightweight truss type brake beam, therefore, these two dimensions are fixed. Present standards of the railroads also require such beams to meet a certain capacity with a minimum specified deflection. Other things being equal, the deflection of such a beam may be decreased by increasing its depth, that is by increasing the length of the fulcrum. In this case the length of the fulcrum member is fixed in accordance with standards already mentioned; however, the relative depth of the brake beam may be increased by shortening the tension and compression members and this I have accomplished by a novel form of connection between the brake heads and the ends of the tension and compression members. In effect, therefore, I have increased the relative depth of this truss by shortening the length of the tension and compression members and at the same time maintaining the standard distance "A" as well as the standard length of the fulcrum 6.

In assembling a beam of this type a certain amount of camber is placed in the compression member 2 as the nuts 18 are tightened on the tension member 4 securing the heads upon the ends of these members and drawing all the parts tightly together. One result of such a camber or bending of the compression member 2 is to angle the heads slightly toward each other as indicated in Figure 1 where the distance "M" between two vertical planes bisecting the respective heads outwardly of the beam is greater than the distance "N" between these two planes inwardly of the beam. This inward angling of the brake heads produces a more satisfactory fit of the brake shoes upon the tread surfaces of the wheels since the diameter of a wheel is made greater near the flange.

This inward angling of the heads produces another effect, however, which is undesirable. This effect is most clearly shown by a consideration of Figures 3 and 8. Figure 3 shows the position of this beam when applied to a car wheel. The point 20 indicates the center of the car wheel; the arc 22 indicates its outer circumference or tread surface; and the line Y—Y indicates a horizontal plane through the wheel center. For mechanical reasons which need not be discussed here, the beam is suspended at a level considerably below the center of the wheel. Locating the beam at such a level while at the same time angling the heads inwardly upon the beam as above described results in a misalignment between the brake shoe carrying surfaces of the brake head and therefore of the brake shoe itself against the tread surface of the wheel. This is clearly shown in Figure 8 wherein the full lines indicated at 24 show the position assumed by the brake shoe against the tread surface 26 of the car wheel generally indicated at 28. The dotted or phantom line 30 indicates the position which the brake shoe assumes upon the tread surface of the wheel 28 when the beam is constructed in accordance with my invention.

Figure 4:
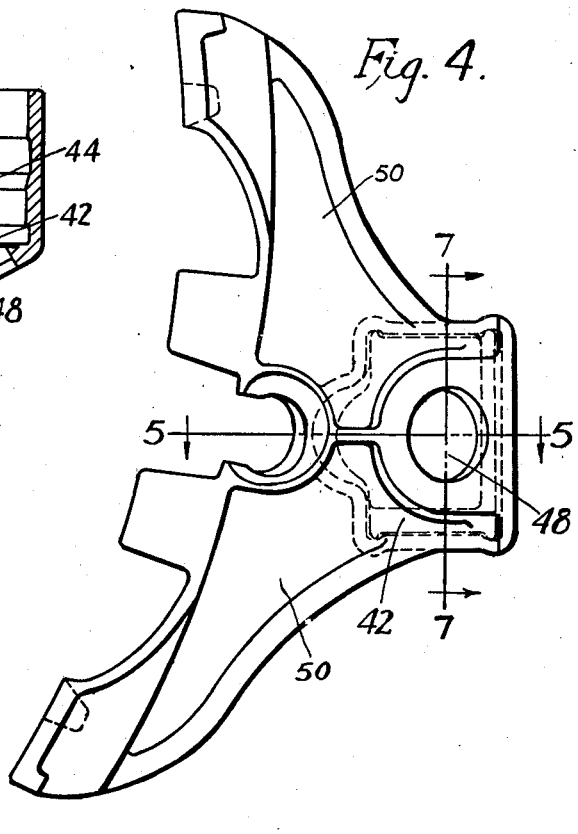
Figure 4 is an enlarged end view of one of the brake heads.
Figure 7:
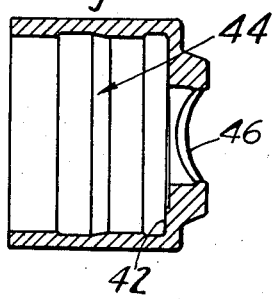
Figure 7 is a vertical section through the brake head on the plane indicated by the line 7—7 of Figure 4.

It is apparent that with the ordinary structure of beam the lower end of the brake shoe at the point 32 is much nearer the flange 34 of the wheel 28 than the upper end of the shoe as indicated at 36. With the beam constructed in accordance with my invention, however, the upper and lower ends of the brake shoe as indicated at 38 and 40 respectively are equally distant from the wheel flange 34 since the brake head is constructed and arranged upon the compression member in such a manner as to compensate for the above mentioned misalignment which otherwise occurs as a result of the inward angling of the brake heads. This compensation I have provided in the form of a pad 42 (Figs. 4, 5 and 7) on the brake head where the bottom edge of the compression member abuts or seats against the brake head.

This pad 42 extends across the bottom of the pocket 44 on the inner side of each brake head within which is received and seated the end of the compression member 2. From a consideration of Figures 4, 5 and 7 it will be apparent that when the compression member 2 is seated within the pocket 44 its lower edge or bottom angle iron will abut or seat against the pad 42 provided at the base of the opening 44. This results in a slight outward angling of the lower ends of the heads when assembled upon the compression member 2, thus compensating for the misalignment which otherwise takes place between the upper and lower ends of the brake heads as the result of the inward angling of the heads upon the beam caused by the camber placed in the compression member as above described. This slight angling effect is shown in an exaggerated way in Figure 2A where the distance "C" between the tops of the brake heads at opposite ends of the beam is somewhat less than the distance "D" between the brake heads near their lower edges. In this Figure 2A, I have shown the brake heads positioned upon the compression member of the beam. This view shows the manner in which the pad 42 causes each brake head to assume an angular position upon the channel-shaped compression member 2 before any camber is placed in said compression member. After the beam is assembled as shown in Figure 1 and the parts are drawn up tight, thus cambering the compression member 2, the brake heads assume the position shown in Figure 2.

The desired angularity of the compression member seat inside of the brake head with respect to the vertical center plane of the brake head is about one thirty-second to three sixty-fourths of an inch in three inches; expressed in degrees, this is equivalent to from two thirds of a degree to approximately one degree. As stated above, this angularity may be provided by cutting the ends of the compression member at angles varying approximately that amount from normal to the axle of said member. In actual production I may obtain a variation in this angularity but for best results it should be held, as closely as practical, to that specified above.

Figure 6:
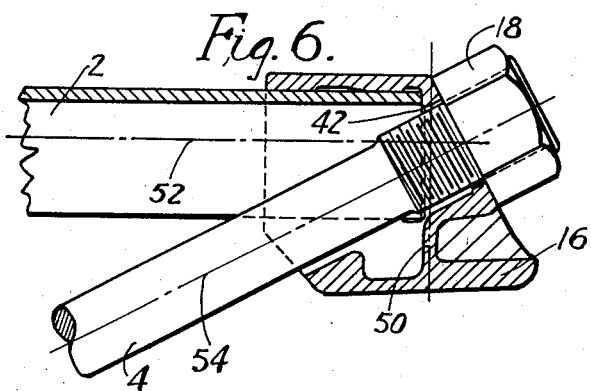
Figure 6 is a view corresponding to Figure 5 but showing the tension and compression members in position, the latter in section.

The manner in which the compression member 2, the tension member 4 and the brake head 16 are secured together in assembly is best shown in Figure 6. The section through the head in Figure 6 is the same as that shown in Figure 5. The pad 42 provides a seat against which abuts the lower angle iron or bottom edge of the compression member 2. The tension member 4 is received between the top and bottom walls of the compression member 2 within the slot 46 and extends through the pocket 44 and the eye 48 where it is secured in position by the nut 18 which is threaded upon the end of said rod.

The effect of providing the pad 42 at the bottom of the compression member seat on the head is the same as if the ends of the compression member were cut on a slight diagonal instead of at right angles to its length and I may accomplish the same result by providing a compression member with its ends cut on such a slight diagonal and arranged with the longer edge of the compression member at the bottom side of the beam.

It will be observed that the brake head 16 has a central vertical reinforcing web or wall 50 which extends from the top to the bottom of said head. It will be further observed that this web or wall 50 forms the seat for the end of the compression member 2 as it abuts against the head in assembly. By this arrangement the compression member seat within the head is a continuation of the vertical wall or web 50 which provides the structural strength necessary in the severe service to which such railway equipment is subjected. It will also be seen that the portion of the web 50 forming the seat for the compression member is immediately behind the pressure center of the head and thus acts as a structural reinforcement at the point where the head is subjected to maximum stresses.

It will be apparent, therefore, that in providing this novel form of end assembly for a brake beam, I have not only decreased the length of the tension and compression members while maintaining the standard length of the fulcrum and the standard distance between the shoe-carrying surfaces of the brake head, thus increasing the relative depth of this beam as a truss member, but I have also located the seat for the compression member within the brake head at the point where it provides maximum support to the brake head through the central portion and behind the pressure center where the greatest braking stresses occur in service.

The compactness of the structure I have provided is well shown in Figure 6 wherein the dotted line 52 indicates the axis of the compression member 2 and the dotted line 54 indicates the axis of the tension member 4. It will be observed that these two axes meet very close to the web or wall 50 which forms the compression member seat within the head. In this brake beam assembly, therefore, I have provided a compact connection between the compression member and the tension member at a point immediately behind the pressure center of the head and very close to the vertical reinforcing wall or web 50.

A frequent cause of failure of brake beams is a fracture through the threaded end of the tension member where the section modulus of that member has been decreased by the formation of threads therein. In my brake beam I have avoided this difficulty by providing a special form of tension member. The ends of my tension member, which are designed to be threaded, are upset to provide a greater diameter than the remainder of said rod so that when the said ends have been threaded the minimum diameter at the base of said threads will be at least as great as the maximum diameter of the remainder of said rod. By this relatively simple device in combination with the other features of my invention, I have eliminated one of the chief sources of failure of such brake beams.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. The combination of a truss type brake beam having a compression member, a tension rod with threaded ends, a fulcrum, and brake heads having seats for the ends of said compression member approximately in the vertical center planes of said heads but angled therefrom approximately one degree, the minimum diameter of said threaded ends being equal to or greater than the diameter of the remainder of said rod, the connection between said member and said rod being inward of the vertical planes defining the outer surfaces of said heads whereby the angle at which said member and said rod meet is increased, and the length of said compression member diminished without diminishing the distance between the shoe carrying surfaces of said heads.

2. The combination of a truss type brake beam and a compression member, a tension rod with threaded ends, a fulcrum, and brake heads having seats for said compression member approximately in but angled one degree or less from the vertical center plane of said heads, the minimum diameter of said threaded ends being equal to or greater than the maximum diameter of the remainder of said rod, and the axes of said member and said rod meeting near the vertical center planes of said heads whereby the angle at which they meet is increased and the depth of said truss is increased for a given length of said fulcrum and a given distance between the brake shoe carrying surfaces of said heads.

3. The combination of a truss type brake beam having a compression member, a tension rod with threaded ends, a fulcrum, and brake heads having seats for the ends of said compression member approximately in but angled one degree or less from the vertical center plane of said heads, the minimum diameter of said threaded ends being equal to or greater than the diameter of the remainder of said rod, and the connection between said member and said rod being inward of the vertical planes defining the outer surfaces of said heads whereby the angle at which said member and said rod meet is increased and the relative depth of said truss is increased for a given length of said fulcrum.

4. The combination of a truss type brake beam having a compression member, a tension rod with threaded ends, a fulcrum, and brake heads having seats for the ends of said compression member approximately in but angled one degree or less from the vertical center plane of said heads, the minimum diameter of said threaded ends being equal to or greater than the diameter of the remainder of said rod and the connections between said member and said rod being inward of the vertical planes defining the outer surfaces of said heads whereby the angle at which said member and said rod meet is increased and the relative depth of said truss is increased for a given length of said fulcrum.

5. The combination of a truss type brake beam having a compression member, a tension rod with a threaded end, a fulcrum, and a brake head having a seat for said compression member approximately in the vertical central plane thereof but angled one degree or less from said plane, the minimum diameter of said threaded end being equal to or greater than the maximum diameter of the remainder of said rod, the axes of said member and said rod meeting approximately behind the pressure center of said head.

6. The combination of a truss type brake beam having a compression member, a tension rod with a threaded end, a fulcrum, and a brake head having a seat for said compression member approximately in the vertical central plane thereof but angled one degree or less from said plane, the maximum diameter of said threaded end being equal to or greater than the maximum diameter of the remainder of said rod, the axes of said member and said rod meeting near the vertical central plane of said head.

7. The combination of a truss type brake beam having a compression member, a tension rod with a threaded end, a brake head having a compression member seat approximately in the vertical center plane of said head but angled one degree or less from said plane, the axes of said member and said rod meeting near the said vertical plane and inwardly of the vertical plane defining the outer surface of said head, whereby the depth of said truss is increased without diminishing the distance between the wheel contacting surfaces of the heads and without increasing the length of said fulcrum.

8. The combination of a truss type brake beam having a compression member, a tension member with a threaded end, a fulcrum, and a brake head having a compression member seat approximately in the vertical center plane of said head but angled one degree or less from said plane, the axes of said member and said rod meeting near the said vertical plane and inwardly of the vertical plane defining the outer surfaces of said head, whereby the angle at which said axes meet is increased and the relative depth of said truss is increased for a given length of said fulcrum.

9. A truss type brake beam having a compression member, a tension rod with a threaded end, and a brake head having a seat for said compression member approximately in the vertical center plane of said head but angled one degree or less therefrom, the minimum diameter of said threaded end being equal to or greater than the maximum diameter of the remainder of said rod, and the axes of said tension rod and compression member meeting near the said vertical center plane.

10. The combination of a truss type brake beam having a compression member, a tension rod with a threaded end, a brake head having a seat for said compression member, said seat being approximately at the vertical center plane of said head but angled one degree or less from said plane, and the minimum diameter of said threaded end being at least equal to the maximum diameter of the remainder of said rod.

11. The combination of a truss type brake beam having a compression member, a tension member, and brake heads having seats for the ends of said compression member near but angled one degree or less from the vertical center plane of said head.

12. The combination of a truss type brake beam having a compression member, a tension rod, a fulcrum, and brake heads seated on the respective ends of said compression member, said ends being cut at an angle of one degree or less from the normal to the axis of said member whereby said brake heads assume an angular position on said member and are aligned with the tread surface of an associated wheel when assembled in operative position.

13. The combination of a truss type brake beam having a compression member and brake heads seated on the ends thereof, said ends being cut at an angle of less than one degree from the normal to the axis of said member, whereby said brake heads are aligned with the tread surface of an associated wheel.

14. A truss type brake beam having a compression member, a tension rod, a fulcrum, and brake heads mounted on the ends of said member at an angle of one degree or less from the normal to the axis of said member, whereby when assembled in operative position the distance between the upper ends of said brake heads is substantially equal to the distance between the lower ends of said heads.

15. A truss type brake beam having a compression member, a tension rod, and brake heads having seats for the ends of said compression member approximately in but angled one degree or less from the vertical center plane of said head, said tension member having upset threaded ends whose minimum diameter is equal to or greater than the diameter of the remainder of said rod.

16. A truss type brake beam having a compression member, a tension rod, and a brake head mounted on the ends of said member at an angle varying one degree or less from the normal to the axis of said member, whereby said brake head when assembled on said member assumes a corresponding angularity thereto.

17. A truss type brake beam having a compression member, a tension rod, and a brake head mounted on the ends of said member at an angularity varying one degree or less from the normal to the axis of said member, whereby said head when assembled in operative position is aligned with the tread surface of an associated car wheel.

18. In a truss type brake beam, a compression member, a tension rod, a fulcrum, and brake heads having seats for said member approximately in the vertical center plane of said head, the connection between said head and said member being so constructed and arranged that said head assumes an angularity of one degree or less from the normal to the axis of said member, whereby said head when placed in operative position adjacent an associated car wheel is aligned with the tread surface of said wheel.

19. A truss type brake beam having a compression member, a tension rod, and a brake head with a compression member socket and an orifice for said tension member on planes intersecting approximately in the vertical center plane of said head, said head being mounted on said member at an angle one degree or less from the normal to the axis of said member, whereby said head when in operative position assumes alignment with the tread surface of an associated car wheel.

20. A truss type brake beam having a compression member, a tension rod with threaded ends, brake heads having sockets for the ends of said member and apertures for said threaded ends, nut seats on the outer faces of said heads, and nuts threaded on said ends and abutting said seats, the axes of said member and said rod intersecting approximately in the vertical planes of said heads, said heads being assembled on said member at angles varying one degree or less from the normal to the axis of said member and in opposite directions from said normal.

21. A truss type brake beam having a compression member, a tension rod with threaded ends, brake heads having sockets for the ends of said member and apertures for said threaded ends, nut seats on the outer faces of said heads, and nuts threaded on said ends and abutting said seats, said heads being assembled on said member at angles varying one degree or less from the normal to the axis of said member and in opposite directions from said normal.

22. A truss type brake beam comprising a compression member, a tension rod with threaded ends, a fulcrum, and brake heads having seats for said compression member and apertures for said threaded ends, the minimum diameter of said threaded ends being equal to or greater than the diameter of the remainder of said rod, said heads being seated upon said member at angles varying approximately one degree from the normal to the axis of said member, whereby said heads when in operative position are in alignment with the tread surfaces of the associated wheels.

23. A truss type brake beam having a compression member, a tension rod with threaded ends, and brake heads having seats for the ends of said member approximately in the vertical center plane of said heads, said threaded ends being upset so that their minimum diameter is equal to or greater than the diameter of the remainder of said rod, said heads being seated upon said member at angles varying approximately one degree from the normal to the axis of said member, whereby said heads when in operative position are aligned with the tread surfaces of the associated car wheels.

24. In a brake head for a truss type beam, a compression member seat positioned approximately at the vertical center plane of said head but angled one degree or less from said plane.

25. A brake head having a compression member seat positioned approximately in the vertical center plane of said head but angled one degree or less therefrom.

26. In a brake head for a truss beam, a cored out socket for a beam member, the axis of said socket varying one degree or less from normal to the center plane of said head.

WALTER H. BASELT.